(12) United States Patent
Kawai et al.

(10) Patent No.: US 10,315,896 B2
(45) Date of Patent: *Jun. 11, 2019

(54) ELECTRIC WINCH DEVICE

(71) Applicants: Kobe Steel, Ltd., Kobe-shi (JP); KOBELCO CONSTRUCTION MACHINERY CO., LTD., Hiroshima-shi (JP)

(72) Inventors: Hiroaki Kawai, Kobe (JP); Takashi Hiekata, Kobe (JP); Shintaro Sasai, Hyogo (JP); Naoto Hori, Hyogo (JP); Toshiro Yamashita, Hyogo (JP); Koichi Shimomura, Hyogo (JP)

(73) Assignees: Kobe Steel, Ltd., Kobe-shi (JP); KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 89 days.

This patent is subject to a terminal disclaimer.

(21) Appl. No.: 15/327,904

(22) PCT Filed: Jul. 10, 2015

(86) PCT No.: PCT/JP2015/069940
§ 371 (c)(1),
(2) Date: Jan. 20, 2017

(87) PCT Pub. No.: WO2016/013430
PCT Pub. Date: Jan. 28, 2016

(65) Prior Publication Data
US 2017/0210606 A1 Jul. 27, 2017

(30) Foreign Application Priority Data
Jul. 25, 2014 (JP) .................... 2014-152009

(51) Int. Cl.
*B66D 5/18* (2006.01)
*B60T 8/17* (2006.01)
(Continued)

(52) U.S. Cl.
CPC .................. *B66D 5/18* (2013.01); *B60T 8/17* (2013.01); *B66C 13/28* (2013.01); *B66C 13/46* (2013.01);
(Continued)

(58) Field of Classification Search
CPC . B66D 5/02; B66D 1/12; B66D 1/485; B66D 1/54; B66C 13/28
See application file for complete search history.

(56) References Cited

U.S. PATENT DOCUMENTS 6,029,951 A * 2/2000 Guggari ................. B66D 1/485
173/11
6,851,207 B2 * 2/2005 Yoshimatsu .......... E02F 9/2075
37/348

(Continued)

FOREIGN PATENT DOCUMENTS

EP 1 591 409 A2 11/2005
EP 2 623 361 A1 8/2013
(Continued)

OTHER PUBLICATIONS

International Search Report dated Oct. 13, 2015 in PCT/JP2015/069940 filed Jul. 10, 2015.

*Primary Examiner* — Michael E Gallion
(74) *Attorney, Agent, or Firm* — Oblon, McClelland, Maier & Neustadt, L.L.P.

(57) ABSTRACT

An electric winch device includes a required braking force estimation section which estimates a required braking force required to stop a free-falling object at a position at an allowable stopping height; a braking force determination (Continued)

section which determines, out of an operational braking force, each of a first braking force to be borne by a braking device and a second braking force to be borne by a braking force which is generated in an electric motor due to consumption of regenerative power; and a control section which causes the braking device to apply the first braking force to a winch drum. The braking force determination section determines the first braking force to be a braking force equal to or greater than the required braking force when, at a time of stopping of the free-falling object, the operational braking force is equal to or greater than the required braking force.

6 Claims, 3 Drawing Sheets

(51) Int. Cl.
*B66C 13/28* (2006.01)
*B66D 5/30* (2006.01)
*B66D 1/48* (2006.01)
*B66C 13/46* (2006.01)

(52) U.S. Cl.
CPC ............... *B66D 1/485* (2013.01); *B66D 5/30* (2013.01); *B66D 2700/0141* (2013.01); *B66D 2700/03* (2013.01)

(56) References Cited

U.S. PATENT DOCUMENTS

| | | | |
|---|---|---|---|
| 7,659,677 B2* | 2/2010 | Yoshimatsu | E02F 9/121 |
| | | | 318/362 |
| 8,881,519 B2* | 11/2014 | Kamimura | E02F 9/123 |
| | | | 60/414 |
| 2005/0072965 A1 | 4/2005 | Sanders et al. | |
| 2016/0289054 A1* | 10/2016 | Hiekata | B66D 1/46 |
| 2017/0043983 A1* | 2/2017 | Hiekata | B66C 13/12 |
| 2017/0210606 A1* | 7/2017 | Kawai | B60T 8/17 |

FOREIGN PATENT DOCUMENTS

| | | |
|---|---|---|
| EP | 3 072 845 A1 | 9/2016 |
| GB | 1 260 135 A | 1/1972 |
| JP | 7-55792 B2 | 6/1995 |
| JP | 10-7382 A | 1/1998 |
| JP | 2007-166775 A | 6/2007 |
| JP | 4855787 B2 | 1/2012 |
| JP | 2014-25517 A | 2/2014 |

* cited by examiner

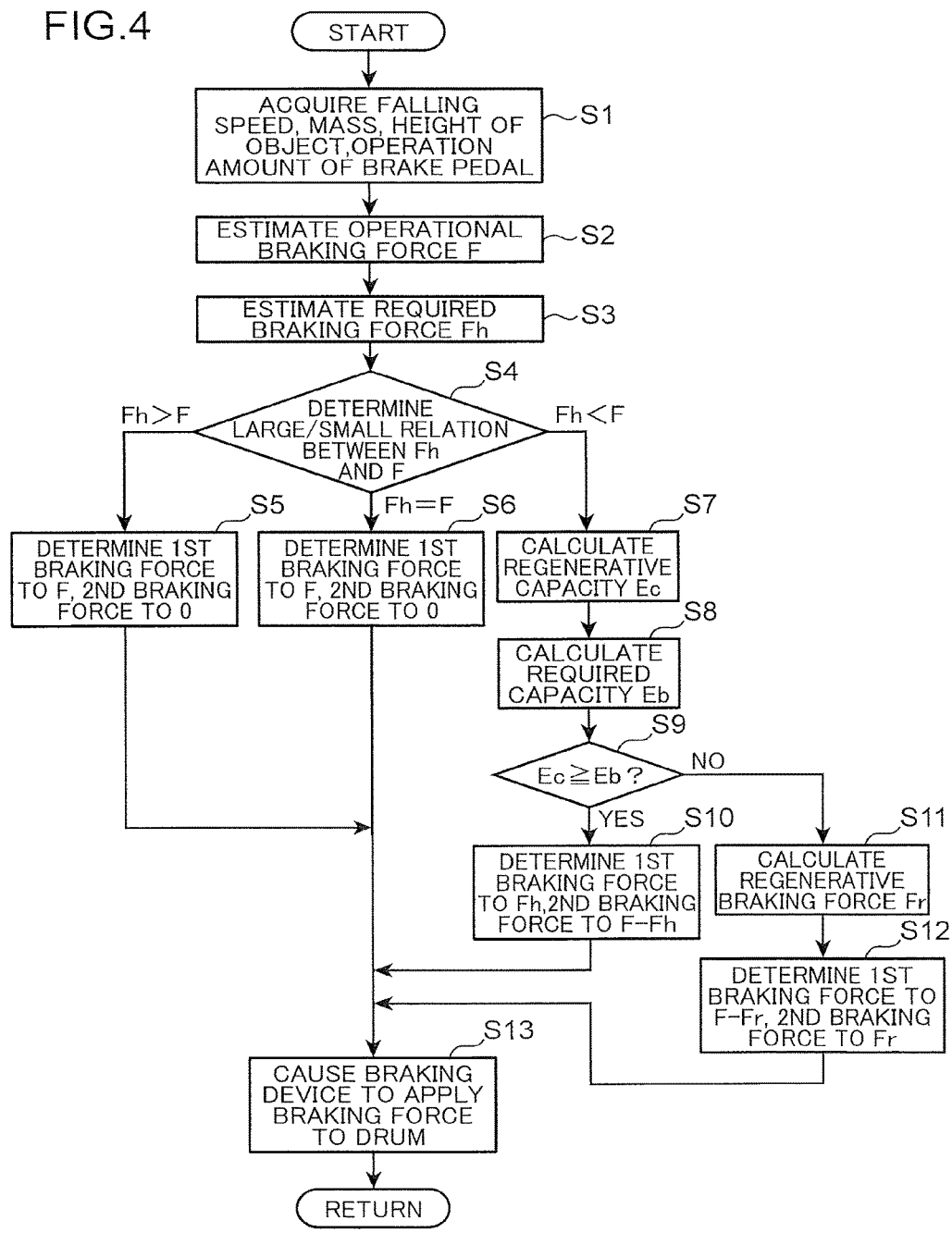

ELECTRIC WINCH DEVICE

TECHNICAL FIELD

The present invention relates to an electric winch device for use in a crane.

BACKGROUND ART

Conventionally known as a winch device mounted on a crane for conducting hoisting work (crane work) is an electric winch device driven by an electric motor to raise an object for hoisting work. Then, a known electric winch device is provided with a regeneration function of converting, during the lowering of an object, kinetic energy generated due to the moving-down of the object into electric energy and recovering the same. Patent Literature 1 set forth below discloses one example of an electric winch device provided with such a regeneration function.

The electric winch device disclosed in Patent Literature 1 is provided with a motor as an electric motor, and electricity storage means which stores regenerative power generated in the motor during the lowering. The motor is configured to be driven by at least one of electric power supplied from the electricity storage means and electric power supplied from a commercial power source to operate a crane.

Some movable cranes use an electric winch device capable of conducting a moving-down of an object, in which the object is lowered in a state close to the free-fall. When such an electric winch device is provided with the regeneration function as described above, at the time of the free-fall of the object, electric power is regenerated by an electric motor and the regenerated electric power is consumed through storage of electricity in an electricity storage device, resulting in generating a braking force in the electric motor. The braking force generated in the electric motor brakes rotation of a winch drum in a lowering direction, resulting in braking the free-fall of the object.

However, when a fail such as a short-circuit develops in any part of an electric system leading from the electricity storage device to the electric motor, electric power regenerated by the electric motor is not consumed, so that no braking force is obtained by regeneration. Although an allowable stopping height is set as a height of a lowest position at which the object is required to be stopped by braking operation, at the time of the free-fall of the object, when no braking force is obtained by regeneration as described above, the object might move down to a position at a height lower than the allowable stopping height.

CITATION LIST

Patent Literature

Patent Literature 1: Japanese Unexamined Patent Publication No. 2007-166775

SUMMARY OF INVENTION

The present invention aims to prevent an object, at the time of a free-fall of the object, from moving down to a position at a height lower than an allowable stopping height even when a fail develops in an electric system leading from a regenerative power consumption unit such as an electricity storage device to an electric motor, in an electric winch device of a crane provided with a regeneration function.

An electric winch device according to one aspect of the present invention is an electric winch device provided in a crane for raising and lowering an object, the electric winch device comprising: an electric motor; a winch drum driven by the electric motor to rotate for raising of the object; a braking device which brakes rotation of the winch drum; a braking operation part to be operated for stopping moving-down of the object; a regenerative power consumption unit which consumes at least a part of regenerative power regenerated by the electric motor at the moving-down of the object to cause the electric motor to generate a braking force on the rotation of the winch drum; a setting unit for setting an allowable stopping height which is a height of a lowest position at which the object is required to be stopped at a time of a free-fall of the object; an operational braking force estimation section which estimates an operational braking force which is a braking force according to an operation amount of the braking operation part; a required braking force estimation section which estimates a required braking force which is a braking force required to stop the free-falling object at a position at the allowable stopping height set by the setting unit; a braking force determination section which determines, out of the operational braking force, each of a first braking force to be borne by the braking device and a second braking force to be borne by a braking force which is generated in the electric motor due to consumption of the regenerative power; and a control section which causes the braking device to apply the first braking force, which has been determined by the braking force determination section, to the winch drum, wherein the braking force determination section determines the first braking force to be a braking force equal to or greater than the required braking force when, at a time of stopping of the free-falling object, the operational braking force estimated by the operational braking force estimation section is equal to or greater than the required braking force estimated by the required braking force estimation section.

BRIEF DESCRIPTION OF DRAWINGS

FIG. 4 is a flow chart showing operation of the electric winch device at the time of braking a free-fall of an object.

DESCRIPTION OF EMBODIMENT

Figure 1:
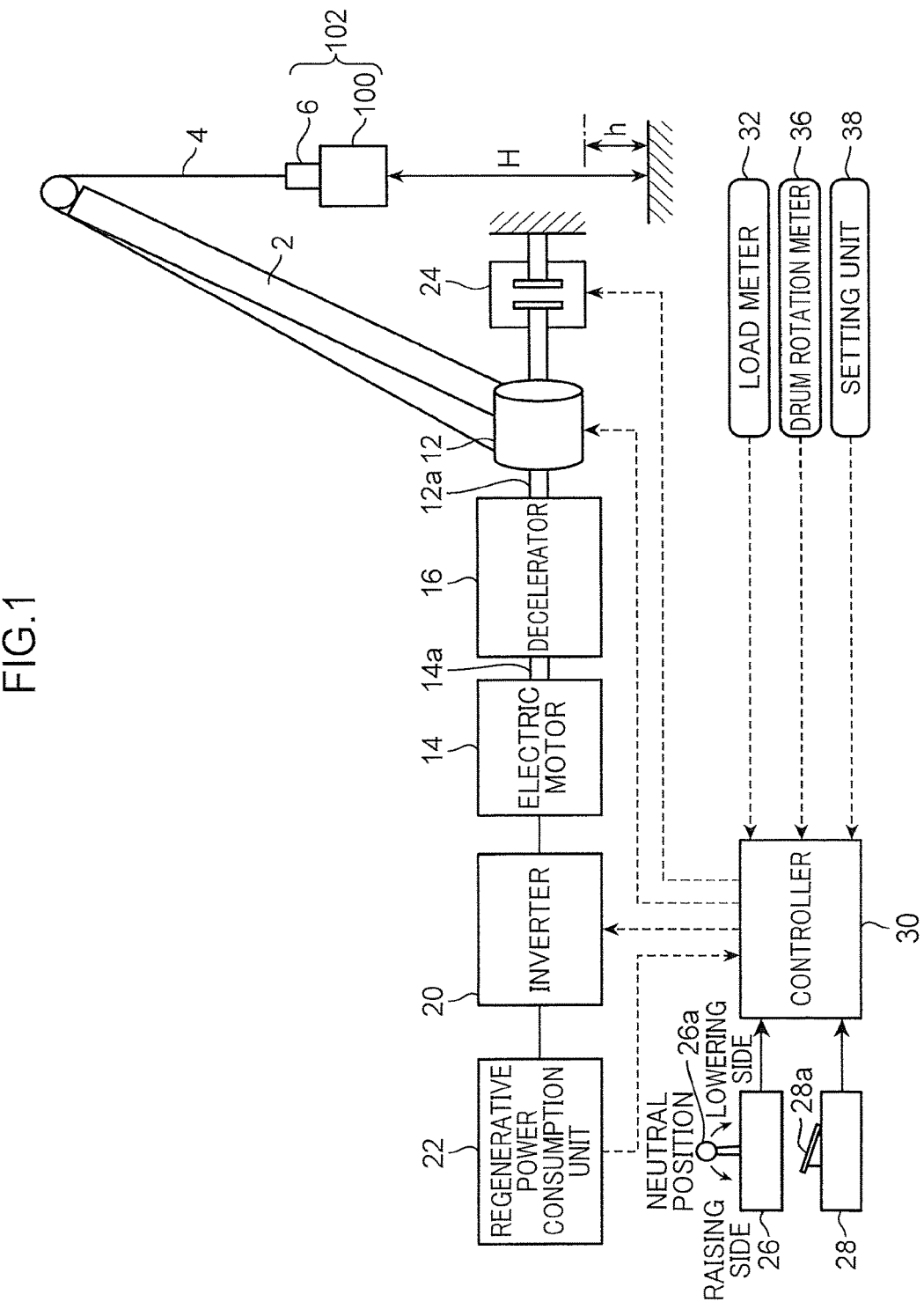
FIG. 1 is a schematic view of a configuration of an electric winch device according to one embodiment of the present invention.

In the following, an embodiment of the present invention will be described with reference to the drawings.

First, with reference to FIG. 1 to FIG. 3, a configuration of an electric winch device according to one embodiment of the present invention will be described.

The electric winch device according to the present embodiment is provided in a crane for use as a winch device for a hoisting load which conducts raising/lowering of a hoisting load 100. The crane provided with the electric winch device of the present embodiment includes a boom 2 (see FIG. 1) provided in a crane main body not shown so as to be capable of derricking. At a distal end of the boom 2, a top sheave 3 is provided. From the distal end of the boom 2, a hook device 6 is suspended via a hoisting rope 4 which is a wire rope. The hook device 6 includes a hook sheave not shown. The hoisting rope 4 is wound around the hook sheave and the top sheave 3 a predetermined number of times. The hoisting load 100 is hung by the hook device 6. Hereinafter, the hook device 6 and the hoisting load 100 hung therefrom will be integrally referred to as an object 102 to be raised/lowered. The electric winch device is mounted on the crane main body not shown to conduct raising/lowering of the object 102 via the hoisting rope 4.

In the following, a specific configuration of the electric winch device according to the present embodiment will be described.

The electric winch device according to the present embodiment is configured to be able to conduct a moving-down of the object 102, in which the object 102 is lowered in a state close to a free-fall as will be described later. Additionally, the electric winch device according to the present embodiment is provided with a regeneration function of converting kinetic energy caused by the moving-down of the object 102 into electric power and recovering the same. This electric winch device, as shown in FIG. 1, includes a drum 12, an electric motor 14, a decelerator 16, an inverter 20, a regenerative power consumption unit 22, a braking device 24, an operation lever device 26, a brake pedal device 28, a controller 30, a load meter 32, a drum rotation meter 36, and a setting unit 38.

The drum 12 is a winch drum driven by the electric motor 14 to rotate for raising/lowering of the hook device 6 and the hoisting load 100 hung therefrom. In the following, the hook device 6 and the hoisting load 100 hung therefrom will be integrally referred to as the object 102 to be raised/lowered. The drum 12 takes up the hoisting rope 4 by rotation thereof in a raising direction which is one rotation direction, thereby raising the object 102. Additionally, the drum 12 draws out the hoisting rope 4 by rotation thereof in a lowering direction which is a rotation direction reverse to the raising direction, thereby lowering the object 102. At the time of the free-fall of the object 102, the drum 12 freely rotates in the lowering direction to cause the object 102 to move down.

The electric motor 14 is supplied with electric power to operate to rotate the drum 12 in the raising direction. The electric motor 14 functions as a power generator at the time of lowering of the object 102, i.e. when the drum 12 rotates in the lowering direction. A driving shaft 14a of the electric motor 14 is coupled to a rotation shaft 12a of the drum 12 via the decelerator 16. At the time of raising of the object 102, a driving torque of the electric motor 14 is transmitted from the driving shaft 14a to the drum 12 via the decelerator 16 and the rotation shaft 12a, thereby rotating the drum 12 in the raising direction. At the time of the lowering and the free-fall of the object 102, rotation of the drum 12 in the lowering direction is transmitted from the rotation shaft 12a to the electric motor 14 via the decelerator 16 and the driving shaft 14a, so that the electric motor 14 generates power. Thus, regeneration is conducted in which kinetic energy caused by the moving-down of the object 102 is converted into electric energy and recovered. The decelerator 16 slows down rotation of the driving shaft 14a of the electric motor 14 at a predetermined reduction ratio and transmits the resultant rotation to the rotation shaft 12a of the drum 12.

The inverter 20 controls operation of the electric motor 14 in response to a command from the controller 30. Specifically, the inverter 20 controls the number of rotations and an amount of rotation of the electric motor 14 by changing an amount of current to be supplied to the electric motor 14 according to the command from the controller 30, thereby controlling a raising speed and a raising amount of the object 102.

The regenerative power consumption unit 22 is electrically connected to the electric motor 14 via the inverter 20. The regenerative power consumption unit 22 consumes at least a part of regenerative power regenerated by the electric motor 14. Specifically, the regenerative power consumption unit 22 is a storage battery which consumes regenerative power regenerated by the electric motor 14 by storing the power. As the regenerative power consumption unit 22, a combination of a storage battery and a regenerative resistor which consumes regenerative power that cannot be stored in the storage battery may be used. The regenerative power consumption unit 22 supplies the stored electric power to the electric motor 14 via the inverter 20. Consumption, by the regenerative power consumption unit 22, of the regenerative power regenerated by the electric motor 14 leads to generation of a braking force in the electric motor 14. Braking the rotation of the drum 12 by thus generated braking force in the electric motor 14 is referred to as regenerative braking.

The braking device 24 is a mechanical braking device to conduct operation of braking rotation of the drum 12 in the raising direction and the lowering direction. The braking device 24 brakes the drum 12 in response to a control signal from the controller 30, as well as applying, to the drum 12, a braking force designated by the control signal from the controller 30. As the braking device 24, a mechanical brake, a hydraulic clutch or the like is used.

The operation lever device 26 is used by an operator to instruct raising/lowering operation of the object 102 by the electric winch device. The operation lever device 26 includes a lever 26a operated by an operator to instruct rotation of the drum 12 in the raising direction; rotation of the drum 12 in the lowering direction; or stop of the rotation of the drum 12. The lever 26a is operable to a raising side as one side from a neutral position at which an instruction to stop the rotation of the drum 12 is issued and operable to a lowering side as the other side (opposite to the raising side) from the neutral position, the raising side being a side to which an instruction to rotate the drum 12 toward the raising direction of the object 102 is issued, and the lowering side being a side to which an instruction to rotate the drum 12 toward the lowering direction of the object 102 is issued. The operation lever device 26 outputs, to the controller 30, information indicative of an operation direction and an amount of operation from the neutral position of the lever 26a.

The brake pedal device 28 is a device which outputs, to the controller 30, a command for stopping the moving-down of the object 102 at the time of the free-fall of the object 102. The brake pedal device 28 includes a brake pedal 28a operated by an operator for stopping the moving-down of the object 102. The brake pedal 28a is one example of a braking operation part according to the present invention. In the following, the brake pedal 28a will be simply referred to as the pedal 28a. The brake pedal device 28 outputs a signal indicative of an operation state of the pedal 28a to the controller 30. Specifically, the pedal 28a, in a state of not being operated by an operator, i.e. in a state of not being depressed, is placed at a reference position at which the pedal rises highest. In this state, the brake pedal device 28 outputs a signal indicating that the operation amount of the pedal 28a is 0 to the controller 30. Then, when the pedal 28a is operated (depressed) from the reference position by the operator, the brake pedal device 28 outputs, to the controller 30, a signal indicative of the operation amount (the amount of depression) of the pedal 28a from the reference position.

The controller 30 controls operation of the electric motor 14 such that the drum 12 rotates according to operation of the lever 26a, as well as controlling braking operation of the drum 12 by the braking device 24 according to operation of the pedal 28a. Specifically, the controller 30 controls the inverter 20 in response to information, input from the operation lever device 26, indicating an operation direction and an operation amount of the lever 26a, thereby causing the inverter 20 to supply, to the electric motor 14, a current allowing the electric motor 14 to cause the drum 12 to rotate according to the information input from the operation lever device 26. Additionally, the controller 30 controls braking operation of the braking device 24 in response to a signal input from the brake pedal device 28. Detailed internal configuration of the controller 30 will be described later.

The load meter 32 detects a load on the drum 12 via the hoisting rope 4. Specifically, the load meter 32 detects a tension of the hoisting rope 4. The load meter 32 successively detects a tension of the hoisting rope 4 and successively outputs the data item about the detected tension to the controller 30.

The drum rotation meter 36 is for detecting an amount of rotation and a rotation speed of the drum 12. For example, the drum rotation meter 36 includes a plurality of protrusions attached to one end surface of the drum 12 in a rotation shaft direction, and a proximity sensor arranged at the outside of the end surface of the drum 12 and the protrusions in the rotation shaft direction. The plurality of protrusions are arranged, on the end surface of the drum 12 to which the protrusions are attached, at equal intervals along a circumference of the drum 12 centered around the rotation shaft. The proximity sensor detects every passing of each protrusion through a position proximate to the proximity sensor as the drum 12 rotates, and outputs a pulse signal (detection signal) to the controller 30. The controller 30 is configured to estimate an amount of rotation and a rotation speed of the drum 12 on the basis of an input pulse signal.

The setting unit 38 is for setting an allowable stopping height h which is a height of a lowest position at which the object 102 is required to be stopped at the time of the free-fall of the object 102. The setting unit 38 is, for example, an input device for inputting a value of the allowable stopping height h. A height about the object 102 represents a height from a landing point below the object 102 to a lower end of the object 102. The value of the allowable stopping height h set (input) by the setting unit 38 is sent from the setting unit 38 to the controller 30.

Next, the internal configuration of the controller 30 will be described.

Figure 2:
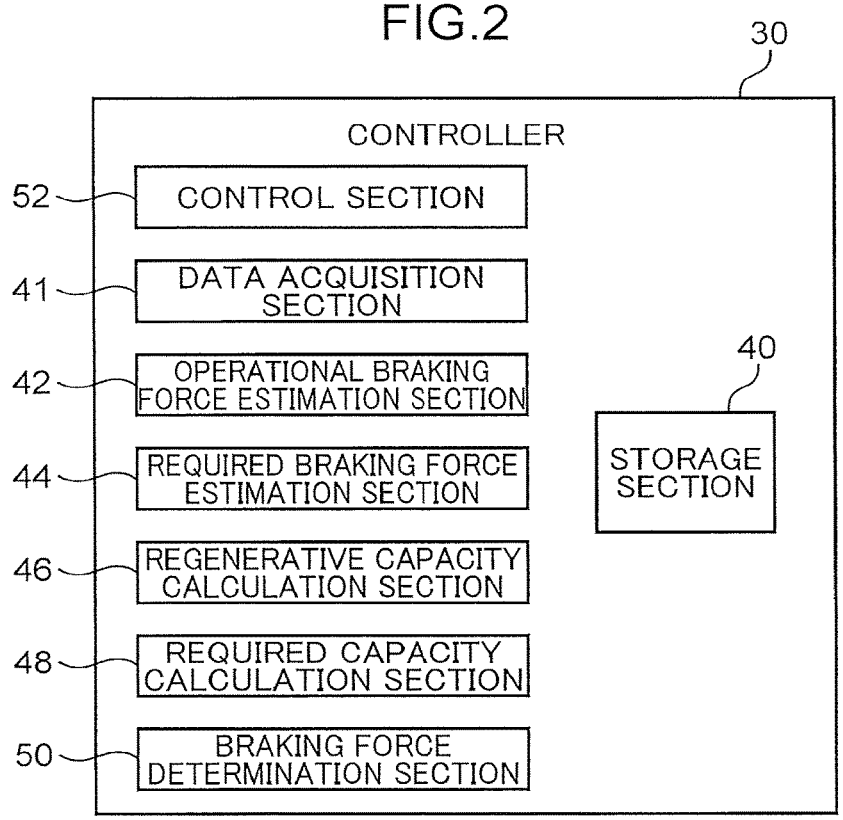
FIG. 2 is a functional block diagram showing a detailed internal configuration of a controller in the electric winch device shown in FIG. 1.
Figure 3:
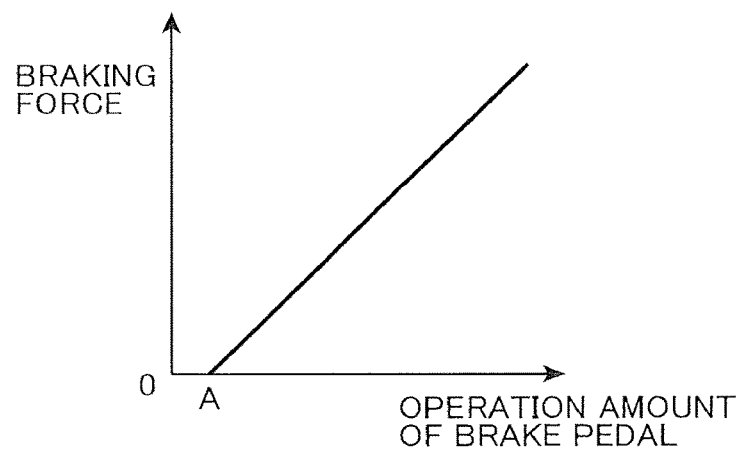
FIG. 3 is a diagram showing operation amount-braking force characteristics as a correlation between an operation amount of a brake pedal and a braking force to be applied to a winch drum according to the operation amount.

As shown in FIG. 2, the controller 30 has a storage section 40 and also has a data acquisition section 41, an operational braking force estimation section 42, a required braking force estimation section 44, a regenerative capacity calculation section 46, a required capacity calculation section 48, a braking force determination section 50 and a control section 52 which serve as a functional block.

The storage section 40 stores various kinds of data items. Specifically, the storage section 40 stores operation amount-braking force characteristics which is a correlation between an operation amount of the pedal 28a and a braking force to be applied to the drum 12 according to the operation amount. The operation amount-braking force characteristics in the present embodiment, as shown in FIG. 3, exhibit a correlation in which the braking force is maintained at 0 from the point of the operation amount 0 corresponding to the reference position of the pedal 28a to a predetermined point A at which the operation amount of the pedal 28a slightly increases, and the braking force linearly increases from the predetermined point A as the operation amount of the pedal 28a increases. A range of the operation amount of the pedal 28a from 0 to the predetermined point A is a range corresponding to a play of the pedal 28a and corresponding to a dead region in which no braking force is applied to the drum 12 even when the pedal 28a is operated. Additionally, the storage section 40 stores a value of the allowable stopping height h to be sent from the setting unit 38 to the controller 30.

The data acquisition section 41 acquires various kinds of data items related to operation of the crane during hoisting work. For example, the data acquisition section 41 acquires data items about a falling speed of the object 102 at the time of the free-fall of the object 102, a mass of the object 102, a height of the position of the object 102, the operation amount of the pedal 28a, and the like.

The data acquisition section 41 acquires a falling speed of the object 102 on the basis of the pulse signal input from the proximity sensor of the drum rotation meter 36 to the controller 30, a draw-out amount (take-up amount) of the hoisting rope 4 per one rotation of the drum 12, and the number of windings of the hoisting rope 4 around the hook sheave and the top sheave 3. Specifically, the data acquisition section 41 counts the number of the pulse signals input from the proximity sensor of the drum rotation meter 36 to the controller 30 per unit time. This number of pulse signals per unit time is proportional to the amount of rotation of the drum 12 per unit time (the rotation speed of the drum 12). The data acquisition section 41 calculates the amount of rotation of the drum 12 per unit time from the counted number of pulse signals per unit time on the basis of the proportional relation. Then, the data acquisition section 41 calculates the falling speed of the object 102 by dividing, by the number of windings of the hoisting rope 4, a value obtained by multiplying the calculated amount of rotation of the drum 12 per unit time by the draw-out amount of the hoisting rope 4 per one rotation of the drum 12.

Additionally, the data acquisition section 41 acquires a mass of the object 102 from data item about a tension of the hoisting rope 4 input from the load meter 32 to the controller 30.

Additionally, the data acquisition section 41 calculates the amount of rotation of the drum 12 corresponding to the counted number of pulse signals on the basis of the proportional relation between the number of pulse signals input to the controller 30 from the proximity sensor of the drum rotation meter 36 and the amount of rotation of the drum 12. Additionally, the data acquisition section 41 acquires information indicating whether the calculated amount of rotation of the drum 12 is the amount of rotation for the raising direction or the lowering direction as the rotation direction, on the basis of information indicative of the operation direction of the lever 26a input from the operation lever device 26 to the controller 30. Then, the data acquisition section 41 successively calculates an amount of change in position of the height of the object 102 in the raising direction or the lowering direction on the basis of the amount of rotation of the drum 12 associated with the acquired rotation direction of the drum 12, the draw-out amount of the hoisting rope 4 per one rotation of the drum 12, and the number of windings of the hoisting rope 4. Specifically, the data acquisition section 41 calculates an amount of change in position of the height of the object 102 by dividing, by the number of windings of the hoisting rope 4, a value obtained by multiplying the calculated amount of rotation of the drum 12 by the draw-out amount of the hoisting rope 4 per one rotation of the drum 12. The data acquisition section 41 successively calculates the amount of change in position of the height of the object 102 from a time point when the object 102 lands at the landing point and adds the records of the calculated amount of change, thereby acquiring a current height of the object 102 from the landing point.

Additionally, from a signal input from the brake pedal operation device 28 to the controller 30, the data acquisition section 41 acquires the operation amount of the pedal 28a which is indicated by the signal.

The operational braking force estimation section 42 (see FIG. 2) estimates an operational braking force which is a braking force according to the operation amount from the reference position of the pedal 28a. Specifically, the operational braking force estimation section 42 estimates, on the basis of the operation amount-braking force characteristics stored in the storage section 40, an operational braking force corresponding to the operation amount of the pedal 28a acquired by the data acquisition section 41. In other words, the operational braking force estimation section 42 estimates an operational braking force corresponding to the operation amount of the pedal 28a indicated by the signal input from the brake pedal device 28 to the controller 30.

The required braking force estimation section 44 (see FIG. 2) estimates a required braking force which is a braking force required to be applied to the drum 12 in order to stop the free-falling object 102 (see FIG. 1) at a position corresponding to the allowable stopping height h.

The regenerative capacity calculation section 46 (see FIG. 2) calculates a regenerative capacity which is an energy capacity corresponding to electric power that can be consumed by the regenerative power consumption unit 22 (see FIG. 1).

The required capacity calculation section 48 (see FIG. 2) calculates a required capacity which is an energy capacity of the regenerative power consumption unit 22 (see FIG. 1), the required capacity being required for the regenerative braking to bear a remaining braking force obtained by subtracting the required braking force from the operational braking force.

The braking force determination section 50 determines each of a first braking force to be borne by the braking device 24 and a second braking force to be borne by the regenerative braking out of the operational braking force estimated by the operational braking force estimation section 42.

Specifically, at the time of stopping the free-falling object 102, when the operational braking force estimated by the operational braking force estimation section 42 is equal to or greater than the required braking force estimated by the required braking force estimation section 44, the braking force determination section 50 determines a braking force equal to or greater than the required braking force as the first braking force and a remaining braking force obtained by subtracting the first braking force from the operational braking force as the second braking force.

More specifically, at the time of stopping the free-falling object 102, when the operational braking force estimated by the operational braking force estimation section 42 is equal to the required braking force estimated by the required braking force estimation section 44, the braking force determination section 50 determines an operational braking force equal to the required braking force as the first braking force. In this case, since the remaining braking force obtained by subtracting the first braking force from the operational braking force attains 0, the second braking force is determined to be 0.

Additionally, at the time of stopping the free-falling object 102, when the operational braking force estimated by the operational braking force estimation section 42 is greater than the required braking force estimated by the required braking force estimation section 44, the braking force determination section 50 determines each of the first braking force and the second braking force according to a large/small relation between the regenerative capacity calculated by the regenerative capacity calculation section 46 and the required capacity calculated by the required capacity calculation section 48. Specifically, in this case, when the regenerative capacity calculated by the regenerative capacity calculation section 46 is equal to or greater than the required capacity calculated by the required capacity calculation section 48, the braking force determination section 50 determines the required braking force estimated by the required braking force estimation section 44 as the first braking force, and a remaining braking force obtained by subtracting the required braking force from the operational braking force estimated by the operational braking force estimation section 42 as the second braking force. Additionally, when the regenerative capacity calculated by the regenerative capacity calculation section 46 is smaller than the required capacity calculated by the required capacity calculation section 48, the braking force determination section 50 calculates the regenerative braking force generated in the electric motor 14 when the regenerative power corresponding to the regenerative capacity is consumed. Then, the braking force determination section 50 determines a remaining braking force obtained by subtracting the calculated regenerative braking force from the operational braking force estimated by the operational braking force estimation section 42 as the first braking force, as well as determining the calculated regenerative braking force as the second braking force.

Additionally, when, at the time of stopping the free-falling object 102, the operational braking force estimated by the operational braking force estimation section 42 is smaller than the required braking force estimated by the required braking force estimation section 44, the braking force determination section 50 determines the operational braking force estimated by the operational braking force estimation section 42 as the first braking force. In this case, since the remaining braking force obtained by subtracting the first braking force from the operational braking force attains 0, the second braking force is determined to be 0.

The control section 52 causes the braking device 24 to apply the first braking force determined by the braking force determination section 50 to the drum 12. Specifically, the control section 52 controls braking operation of the braking device 42 such that the braking device 24 applies the first braking force determined by the braking force determination section 50 to the drum 12.

Next, with reference to the flow chart of FIG. 4, operation of the electric winch device according to the present embodiment will be described. Specifically, description will be made of operation of the electric winch device to be conducted at the time of stopping the free-falling object 102. The flow chart of FIG. 4 shows a control process of one cycle for operation control of the electric winch device according to the present embodiment.

First, before the free-fall of the object 102, the value of the allowable stopping height h is set by the setting unit 38 in advance. The allowable stopping height h is set, for example, to be a value larger than a height of a vehicle or a worker which might enter below the object 102. The allowable stopping height h set by the setting unit 38 is stored in the storage section 40 of the controller 30.

Then, the free-fall of the object 102 is conducted and the operator depresses the pedal 28a of the brake pedal device 28 from the reference position at predetermined timing for stopping the moving-down of the object 102. Responsively, a signal indicative of the operation amount (an amount of depression) from the reference position of the pedal 28a is input from the brake pedal device 28 to the controller 30.

Thereafter, the data acquisition section 41 of the controller 30 acquires various kinds of data items. Here, in response to input of the signal from the brake pedal device 28 to the controller 30, the data acquisition section 41 acquires a falling speed of the object 102 at that time point, the mass of the object 102, a height of the object 102 from the landing point at that time point, and an operation amount of the pedal 28a (Step S1). Specifically, on the basis of the pulse signal input from the proximity sensor of the drum rotation meter 36, the data acquisition section 41 acquires the falling speed of the object 102 and the height of the object 102 from the landing point by the above-described method. Additionally, the data acquisition section 41 acquires a mass of the object 102 from the data item about the tension of the hoisting rope 4 input from the load meter 32 to the controller 30. Additionally, the data acquisition section 41 acquires the operation amount (the amount of depression) of the pedal 28a from the signal input from the brake pedal device 28 to the controller 30. Each of the acquired data items is stored in the storage section 40.

Next, the operational braking force estimation section 42 of the controller 30 estimates an operational braking force F according to the operation amount from the reference position of the pedal 28a (Step S2). Specifically, the operational braking force estimation section 42 estimates, as the operational braking force F, a braking force corresponding to the operation amount of the pedal 28a acquired at the Step S1 on the basis of the operation amount-braking force characteristics (see FIG. 3) stored in the storage section 40.

Thereafter, the required braking force estimation section 44 of the controller 30 calculates a required braking force $F_h$ required for stopping the currently free-falling object 102 at a position corresponding to the allowable stopping height h (Step S3). Specifically, the required braking force estimation section 44 calculates the required braking force $F_h$ on the basis of Equation (1) below. Here, $v_0$ represents a falling speed of the object 102 acquired at the Step S1, m represents a mass of the object 102 acquired at the Step S1, H represents a height from the landing point to the lower end of the object 102, the height being acquired at the Step S1, and g represents a gravitational acceleration. The required braking force estimation section 44 calculates the required braking force $F_h$ using these values and the value of the allowable stopping height h stored in the storage section 40.

[Equation 1]

$$F_h = -m \times \frac{v_0^2 + 2g(H-h)}{2(H-h)} \quad (1)$$

Next, the braking force determination section 50 of the controller 30 compares the required braking force $F_h$ calculated by the required braking force estimation section 44 with the operational braking force F estimated by the operational braking force estimation section 42 at the Step S2 to determine a large/small relation between the required braking force $F_h$ and the operational braking force F (Step S4).

When determining that the operational braking force F is smaller than the required braking force $F_h$, the braking force determination section 50 determines the operational braking force F as the first braking force to be borne by the braking device 24, as well as determining the second braking force to be borne by the regenerative braking to be 0 (Step S5). This case corresponds to a case where the operator stops the object 102 at a position at a height lower than the allowable stopping height h by intentionally adjusting the operation amount of the pedal 28a such that the operational braking force F is smaller than the required braking force $F_h$.

Additionally, also when determining that the operational braking force F is equal to the required braking force $F_h$, the braking force determination section 50 determines the operational braking force F as the first braking force to be borne by the braking device 24, as well as determining the second braking force to be borne by the regenerative braking to be 0 (Step S6).

Additionally, when the braking force determination section 50 determines that the operational braking force F is greater than the required braking force $F_h$, next the regenerative capacity calculation section 46 calculates a regenerative capacity $E_c$ which is electric power that can be consumed by the regenerative power consumption unit 22 at this time point (Step S7). Specifically, when the regenerative power consumption unit 22 includes only a storage battery as in the present embodiment, the regenerative capacity calculation section 46 senses a charge condition of the storage battery to calculate a remaining capacity that can be charged in the storage battery as the regenerative capacity $E_c$. Additionally, when the regenerative power consumption unit 22 includes a combination of a storage battery and a regenerative resistor, the regenerative capacity calculation section 46 calculates the regenerative capacity $E_c$ by adding the remaining capacity of the storage battery and the electric power that can be consumed by the regenerative resistor.

Thereafter, the required capacity calculation section 48 calculates a required capacity $E_b$ required for the regenerative braking to bear a remaining braking force obtained by subtracting the required braking force $F_h$ from the operational braking force F (Step S8). Specifically, the required capacity calculation section 48 first calculates a braking force $(F-F_h)$ of a difference between the operational braking force F and the required braking force $F_h$, as well as calculating, on the basis of Equation (2) below, the required capacity $E_b$ which is required by the regenerative power consumption unit 22 to obtain the calculated braking force $(F-F_h)$ by the regenerative braking.

[Equation 2]

$$E_b = (F - F_h) \times \frac{mv_0^2}{2(F - mg)} \quad (2)$$

Next, the braking force determination section 50 determines a large/small relation between the regenerative capacity $E_c$ calculated at the Step S7 and the required capacity $E_b$ calculated at the Step S8 (Step S9).

When determining that the regenerative capacity $E_c$ is equal to or greater than the required capacity $E_b$, the braking force determination section 50 determines the required braking force $F_h$ estimated by the required braking force estimation section 44 at the Step S3 to be the first braking force to be borne by the braking device 24, as well as determining the differential braking force (F−F$_h$) to be the second braking force to be borne by the regenerative braking (Step S10). The case where the regenerative capacity E$_c$ is equal to or greater than the required capacity E$_b$ corresponds to a case where the regenerative power consumption unit 22 has a capacity that enables the differential braking force (F−F$_h$) to be borne by the regenerative braking.

On the other hand, when determining that the regenerative capacity E$_c$ is smaller than the required capacity E$_b$, the braking force determination section 50 calculates a braking force F$_r$ (regenerative braking force F$_r$) generated in the electric motor 14 due to consumption of the regenerative power corresponding to the regenerative capacity E$_c$ (Step S11). Specifically, the braking force determination section 50 calculates the regenerative braking force F$_r$ satisfying the Equation (3) below. The case where the regenerative capacity E$_c$ is smaller than the required capacity E$_b$ corresponds to a case where the energy capacity (the amount of electric power that can be consumed) of the regenerative power consumption unit 22 is insufficient for the regenerative braking to bear the differential braking force (F−F$_h$).

[Equation 3]

$$E_c = F_r \times \frac{mv_0^2}{2(F - mg)} \quad (3)$$

Then, the braking force determination section 50 determines a remaining braking force (F−F$_r$) obtained by subtracting the calculated regenerative braking force F$_r$ from the operational braking force F as the first braking force to be borne by the braking device 24, as well as determining the calculated regenerative braking force F$_r$ as the second braking force to be borne by the regenerative braking (Step S12). The braking force (F−F$_r$) has a value greater than the required braking force F$_h$.

Lastly, the control section 52 controls braking operation of the braking device 24 such that the braking device 24 applies the first braking force determined by the braking force determination section 50 to the drum 12 (Step S13). Responsively, the first braking force determined at the Step S5, S6, S10 or S12 is applied to the drum 12 by the braking device 24. Additionally, after the Step S10 or S12, the second braking force determined at these Steps is generated in the electric motor 14 due to consumption of the regenerative power by the regenerative power consumption unit 22. As a result, the operational braking force F according to the operation amount of the pedal 28a is applied to the drum 12.

Thereafter, the processing at and after the Step S1 is repeated. As a result, when the operation amount of the pedal 28a changes, the operational braking force F according to the changed operation amount is applied to the drum 12.

In the foregoing manner, the operational braking force is applied to the drum 12 according to the operation of the pedal 28a by the operator, resulting in stopping the free-fall of the object 102.

As described in the foregoing, in the electric winch device according to the present embodiment, at the time of stopping the free-falling object 102, when the operational braking force F is equal to or greater than the required braking force F$_h$, the braking device 24 applies the first braking force equal to or greater than the required braking force F$_h$ to the drum 12. Therefore, even when, at the operation of the pedal 28a for stopping the free-falling object 102, because of a fail developing in an electric system leading from the regenerative power consumption unit 22 to the electric motor 14, no braking force is obtained by regenerative braking to result in failing to obtain the second braking force to be borne by the regenerative braking out of the operational braking force according to the operation amount of the pedal 28a, applying the first braking force equal to or greater than the required braking force F$_h$ by the braking device 24 to the drum 12 enables the object 102 to be stopped at a position at a height equal to or larger than the allowable stopping height h. Accordingly, even when a fail develops in the electric system leading from the regenerative power consumption unit 22 to the electric motor 14, the electric winch device according to the present embodiment prevents the object 102, at the time of the free-fall of the object 102, from moving down to a position at a height lower than the allowable stopping height h.

Additionally, in the electric winch device according to the present embodiment, in a case where the operational braking force F is greater than the required braking force F$_h$ at the time of stopping the free-falling object 102, when the regenerative capacity E$_c$ of the regenerative power consumption unit 22 is smaller than the required capacity E$_b$, the braking force determination section 50 calculates the regenerative braking force F$_r$ generated in the electric motor 14 at the consumption of the regenerative power corresponding to the required capacity E$_b$, and the braking device 24 applies the remaining braking force (F−F$_r$) obtained by subtracting the calculated regenerative braking force F$_r$ from the operational braking force F to the drum 12. Accordingly, at the time of stopping the free-falling object 102, even when the regenerative capacity E$_c$ of the regenerative power consumption unit 22 is short, the electric winch device according to the present embodiment enables the braking device 24 to bear a braking force corresponding to the short of the capacity. Thus, even when the regenerative capacity E$_c$ of the regenerative power consumption unit 22 is short at the time of stopping the free-falling object 102, the operational braking force F according to the operation amount of the pedal 28a can be applied to the drum 12 to stop the object 102.

Additionally, at the time of stopping the free-falling object 102, when the operational braking force F is smaller than the required braking force F$_h$, the electric winch device according to the present embodiment causes the braking device 24 to apply the braking force equal to the operational braking force F to the drum 12. Accordingly, also in this case, the operational braking force F according to the operation amount of the pedal 28a by the operator can be applied to the drum 12 to stop the object 102.

The embodiment disclosed here is for illustrative purpose only and it is not to be construed as limiting in any manner. The scope of the present invention is shown not by the description of the embodiment but by the scope of claims and further includes meanings equivalent to the scope of claims and all the modification within the scope.

For example, an object to be raised/lowered is not limited to such an integral combination of the hook device and the hoisting load as described above. For example, a bucket such as a clamshell may be an object. Then, the present invention may be applicable to an electric winch device of a crane that conducts digging work by causing the bucket to free fall, for example.

Outline of Embodiment

The embodiment is summarized as follows.

The electric winch device according to the embodiment is an electric winch device provided in a crane for raising and lowering an object, the electric winch device comprising: an electric motor; a winch drum driven by the electric motor to rotate for raising of the object; a braking device which brakes rotation of the winch drum; a braking operation part to be operated for stopping moving-down of the object; a regenerative power consumption unit which consumes at least a part of regenerative power regenerated by the electric motor at the moving-down of the object to cause the electric motor to generate a braking force on the rotation of the winch drum; a setting unit for setting an allowable stopping height which is a height of a lowest position at which the object is required to be stopped at a time of a free-fall of the object; an operational braking force estimation section which estimates an operational braking force which is a braking force according to an operation amount of the braking operation part; a required braking force estimation section which estimates a required braking force which is a braking force required to stop the free-falling object at a position at the allowable stopping height set by the setting unit; a braking force determination section which determines, out of the operational braking force, each of a first braking force to be borne by the braking device and a second braking force to be borne by a braking force which is generated in the electric motor due to consumption of the regenerative power; and a control section which causes the braking device to apply the first braking force, which has been determined by the braking force determination section, to the winch drum. The braking force determination section determines the first braking force to be a braking force equal to or greater than the required braking force when, at a time of stopping of the free-falling object, the operational braking force estimated by the operational braking force estimation section is equal to or greater than the required braking force estimated by the required braking force estimation section.

In this electric winch device, even in a case where, at the operation of the braking operation part for stopping the free-falling object, no braking force is obtained by regenerative braking due to a fail developing in an electric system leading from the regenerative power consumption unit to the electric motor, resulting in failing to obtain the second braking force to be borne by the regenerative braking out of the operational braking force according to the operation amount of the braking operation part, when the operational braking force estimated by the operational braking force estimation section is equal to or greater than the required braking force estimated by the required braking force estimation section, the braking device applies the first braking force equal to or greater than the required braking force to the winch drum. Therefore, the object can be stopped at a position at a height equal to or larger than the allowable stopping height. Accordingly, even when a fail develops in the electric system leading from the regenerative power consumption unit to the electric motor, the present electric winch device prevents the object, at the time of the free-fall thereof, from moving down to a position at a height lower than the allowable stopping height.

It is preferable that the electric winch device further includes a regenerative capacity calculation section which calculates a regenerative capacity corresponding to electric power which can be consumed by the regenerative power consumption unit; and a required capacity calculation section which calculates a required capacity which is an energy capacity of the regenerative power consumption unit, the required capacity being an energy capacity required for the electric motor to generate a remaining braking force obtained by subtracting the required braking force from the operational braking force, wherein in a case where the operational braking force is greater than the required braking force at the time of stopping the free-falling object, when the regenerative capacity calculated by the regenerative capacity calculation section is equal to or greater than the required capacity calculated by the required capacity calculation section, the braking force determination section determines the first braking force to be a braking force equal to the required braking force, and when the regenerative capacity calculated by the regenerative capacity calculation section is smaller than the required capacity calculated by the required capacity calculation section, the braking force determination section calculates a regenerative braking force which is a braking force generated in the electric motor due to consumption of the regenerative power corresponding to the regenerative capacity and determines a remaining braking force obtained by subtracting the calculated regenerative braking force from the operational braking force as the first braking force.

According to this configuration, at the time of stopping the free-falling object, even when a regenerative capacity of the regenerative power consumption unit falls short of a required capacity which is required for the electric motor to generate a remaining braking force obtained by subtracting a required braking force from an operational braking force, a braking force corresponding to the capacity shortage can be borne by the braking device. Therefore, even when the regenerative power consumption unit is short of a regenerative capacity at the time of stopping the free-falling object, it is possible to apply an operational braking force according to the operation amount of the braking operation part to the winch drum to thereby stop the object.

In this case, the braking force determination section may calculate the regenerative braking force on the basis of the operational braking force estimated by the operational braking force estimation section, the regenerative capacity calculated by the regenerative capacity calculation section, a mass of the object at a time point when operation of the braking operation part starts, a falling speed of the object at a time point when operation of the braking operation part starts, a height from a landing point below the object to the object at a time point when operation of the braking operation part starts, and the allowable stopping height set by the setting unit.

In the electric winch device, it is preferable that when the operational braking force estimated by the operational braking force estimation section at the time of stopping the free-falling object is smaller than the required braking force estimated by the required braking force estimation section, the braking force determination section determines the first braking force to be a braking force equal to the operational braking force.

According to this configuration, when an operational braking force is smaller than a required braking force at the time of stopping the free-falling object, it is possible to apply an operational braking force according to an operation amount of the braking operation part to the winch drum to thereby stop the object.

As described in the foregoing, according to the embodiment, it is possible to prevent an object, at the time of the free-fall of the object, from moving down to a position at a height lower than an allowable stopping height even when a fail develops in an electric system leading from the regenerative power consumption unit to the electric motor, in the electric winch device of the crane provided with a regeneration function.

The invention claimed is:

1. An electric winch device provided in a crane for raising and lowering an object, the electric winch device comprising:
    an electric motor;
    a winch drum driven by the electric motor to rotate for raising of the object;
    a braking device which brakes rotation of the winch drum;
    a braking operation part to be operated for stopping moving-down of the object;
    a regenerative power consumption unit which consumes at least a part of regenerative power regenerated by the electric motor at the moving-down of the object to cause the electric motor to generate a braking force on the rotation of the winch drum;
    a setting unit for setting an allowable stopping height which is a height of a lowest position at which the object is required to be stopped at a time of a free-fall of the object;
    an operational braking force estimation section which estimates an operational braking force which is a braking force according to an operation amount of the braking operation part;
    a required braking force estimation section which estimates a required braking force which is a braking force required to stop the free-falling object at a position at the allowable stopping height set by the setting unit;
    a braking force determination section which determines, out of the operational braking force, each of a first braking force to be borne by the braking device and a second braking force to be borne by a braking force which is generated in the electric motor due to consumption of the regenerative power; and
    a control section which causes the braking device to apply the first braking force, which has been determined by the braking force determination section, to the winch drum,
    wherein the braking force determination section determines the first braking force to be a braking force equal to or greater than the required braking force when, at a time of stopping of the free-falling object, the operational braking force estimated by the operational braking force estimation section is equal to or greater than the required braking force estimated by the required braking force estimation section.

2. The electric winch device according to claim 1, further comprising:
    a regenerative capacity calculation section which calculates a regenerative capacity corresponding to electric power which can be consumed by the regenerative power consumption unit; and
    a required capacity calculation section which calculates a required capacity which is an energy capacity of the regenerative power consumption unit, the required capacity being an energy capacity required for the electric motor to generate a remaining braking force obtained by subtracting the required braking force from the operational braking force,
    wherein in a case where the operational braking force is greater than the required braking force at the time of stopping the free-falling object, when the regenerative capacity calculated by the regenerative capacity calculation section is equal to or greater than the required capacity calculated by the required capacity calculation section, the braking force determination section determines the first braking force to be a braking force equal to the required braking force, and when the regenerative capacity calculated by the regenerative capacity calculation section is smaller than the required capacity calculated by the required capacity calculation section, the braking force determination section calculates a regenerative braking force which is a braking force generated in the electric motor due to consumption of the regenerative power corresponding to the regenerative capacity and determines a remaining braking force obtained by subtracting the calculated regenerative braking force from the operational braking force as the first braking force.

3. The electric winch device according to claim 2, wherein the braking force determination section calculates the regenerative braking force on the basis of the operational braking force estimated by the operational braking force estimation section, the regenerative capacity calculated by the regenerative capacity calculation section, a mass of the object at a time point when operation of the braking operation part starts, a falling speed of the object at a time point when operation of the braking operation part starts, a height from a landing point below the object to the object at a time point when operation of the braking operation part starts, and the allowable stopping height set by the setting unit.

4. The electric winch device according to claim 1, wherein when the operational braking force estimated by the operational braking force estimation section at the time of stopping the free-falling object is smaller than the required braking force estimated by the required braking force estimation section, the braking force determination section determines the first braking force to be a braking force equal to the operational braking force.

5. The electric winch device according to claim 2, wherein when the operational braking force estimated by the operational braking force estimation section at the time of stopping the free-falling object is smaller than the required braking force estimated by the required braking force estimation section, the braking force determination section determines the first braking force to be a braking force equal to the operational braking force.

6. The electric winch device according to claim 3, wherein when the operational braking force estimated by the operational braking force estimation section at the time of stopping the free-falling object is smaller than the required braking force estimated by the required braking force estimation section, the braking force determination section determines the first braking force to be a braking force equal to the operational braking force.

* * * * *